O. M. FULLER.
Improvement in Fishing Apparatus.

No. 123,164. Patented Jan. 30, 1872.

Witnesses:
John Becker

Inventor:
O. M. Fuller
Per Munn & Co.
Attorneys.

UNITED STATES PATENT OFFICE.

ORANGE M. FULLER, OF CATASAUQUA, PENNSYLVANIA.

IMPROVEMENT IN FISHING-APPARATUS.

Specification forming part of Letters Patent No. 123,164, dated January 30, 1872.

Specification describing a new and Improved Fishing Apparatus, invented by ORANGE M. FULLER, of Catasauqua, in the county of Lehigh and State of Pennsylvania.

My invention consists of a float from which the line is suspended by a trip-lever and spring in such a manner that when a fish takes hold of the hook and pulls on the line, the spring will be tripped by the lever and the fish will be hooked; also a weighted arm, held in a horizontal positition by the spring, will be let fall to raise a flag as a signal that a fish is taken, and the hook will be pulled in by the spring, so as to fasten the fish, the said float being connected by a long line to a reel in the hands of the operator, to be pulled in by him to secure the fish, all being arranged as hereinafter more fully described.

Figure 1:
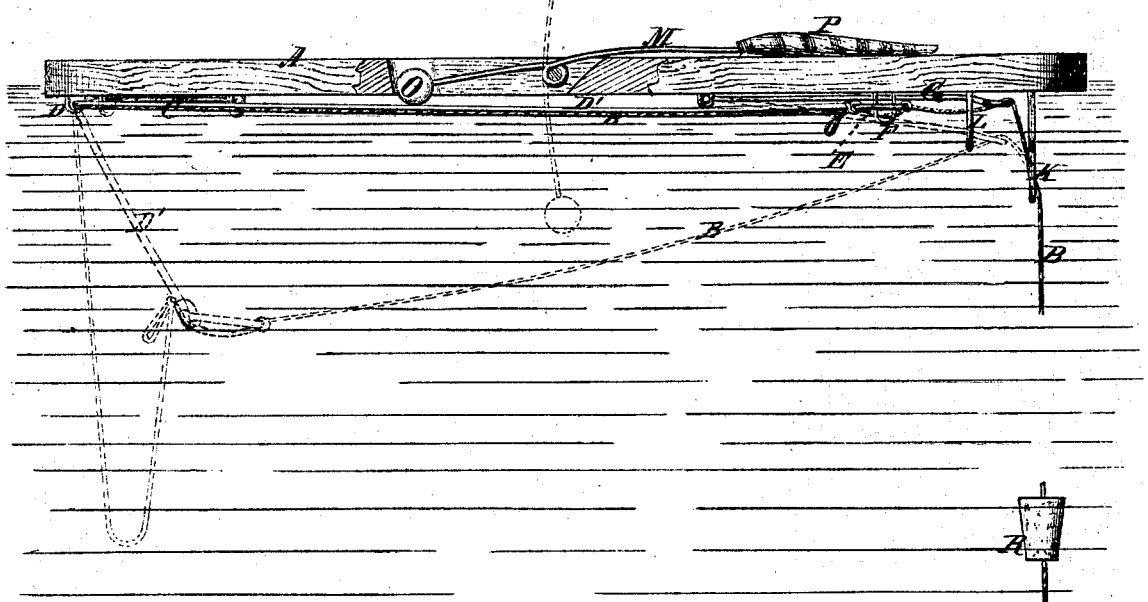
Figure 2:
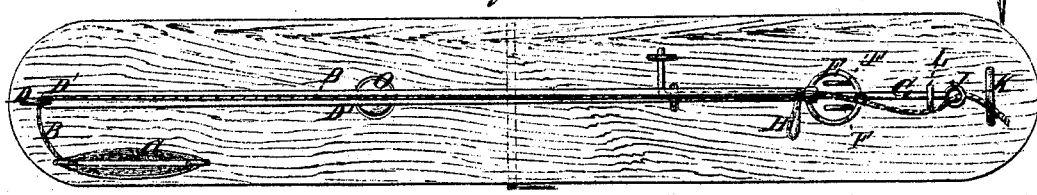

Figure 1 is a side elevation of the apparatus with a part broken out, and Fig. 2 is a plan of the bottom of said apparatus.

Similar letters of reference indicate corresponding parts.

A is the float, consisting of a light piece of board about three feet long, more or less. B is the line, coiled through eyes at C at one end on the under side of the float, to be let out, more or less, according to the depth of the water. D is a staple to which an elastic strap, D', of India rubber is attached, and through which the line extends from the coil. Said spring has a ring, E, in the other end, which is stretched toward the other end of the float and hooked on the staple F under the tripping-spring G, and the line is made fast to the ring at H after being sufficiently let out. It passes through an eye, J, in the free end of the lever, and thence hangs down through the eye K suspended from the end of the float. The free end of the trip-lever passes through a long guide-staple, L, arranged to allow it to swing down considerably. M is a flag-staff, pivoted at N through a vertical slot in the float, near about the center, and having a weight, O, and flag P at the other. This is so arranged that when the spring is stretched onto the staples the ball will be held up by the spring in a cavity in said float, while the flag will lie down on the top.

When a fish takes hold of the hook and pulls on the line the trip-lever will be pulled down and will force the ring E off the staples F. The spring will then contract and pull up the hook, and the weights O will fall and raise the signal flag to show that a fish has been hooked.

In case the water is shallow the line below the eye K may be held up by a cork-float, R, as indicated. The operation will be the same in this case, for the line passing down from the end of the trip-lever through the eye K, will pull said lever down in the same way when a fish is caught.

This simple apparatus may be sent out from the shore or boat in any direction, with any amount of line to be hauled in by the reel, and will be very efficient and useful, especially as it will not frighten the fish.

Having thus described my invention, I claim as new, and desire to secure by Letters Patent—

1. The combination of the float, hook and line, spring, and trip-lever, all arranged substantially as specified.

2. The combination of the float, weighted signal-lever, and the spring, substantially as specified.

ORANGE M. FULLER.

Witnesses:
J. S. LAWALL,
EDWIN SCHLAUCH.